United States Patent
Sattler et al.

(10) Patent No.: US 6,746,228 B2
(45) Date of Patent: Jun. 8, 2004

(54) INJECTION MOULDING DEVICE COMPRISING VALVE PIN POSITION INDICATOR

(75) Inventors: Peter Sattler, Zwingenberg (DE); Udo Liebram, Pfungstadt (DE)

(73) Assignee: Synventive Molding Solutions B.V., 'S-Gravendeel (NL)

( * ) Notice: Subject to any disclaimer, the term of this patent is extended or adjusted under 35 U.S.C. 154(b) by 0 days.

(21) Appl. No.: 10/041,627

(22) Filed: Jan. 10, 2002

(65) Prior Publication Data

US 2002/0114860 A1 Aug. 22, 2002

(30) Foreign Application Priority Data

Jan. 10, 2001 (EP) .............................. 01200060

(51) Int. Cl.7 ............................. B29C 45/23
(52) U.S. Cl. ................. 425/145; 425/169; 425/564
(58) Field of Search ............... 425/562, 563, 425/564, 565, 566, 145, 146, 169

(56) References Cited

U.S. PATENT DOCUMENTS

| | | | |
|---|---|---|---|
| 3,970,034 A | | 7/1976 | Kirk |
| 5,531,581 A | | 7/1996 | Donnell, Jr. |
| 5,894,025 A | * | 4/1999 | Lee et al. .................. 425/562 |
| 6,386,508 B1 | * | 5/2002 | Steil et al. ................. 425/564 |

FOREIGN PATENT DOCUMENTS

| | | |
|---|---|---|
| DE | 1140 110 | 11/1962 |
| DE | 38 33 220 A1 | 4/1990 |
| EP | 0 269 091 | 6/1988 |
| EP | 0 936 048 A1 | 8/1999 |
| JP | A 4-112020 | 4/1992 |
| WO | 00/71325 A1 | 11/2000 |

OTHER PUBLICATIONS

David Kazmer, "Multi–Cavity Pressure Control in the Filling and Packing Stages of the Injection Molding Process," *Polymer Engineering and Science*, V. 37, 1997, pp. 1865–1879.

* cited by examiner

Primary Examiner—Tim Heitbrink
(74) Attorney, Agent, or Firm—Young & Thompson

(57) ABSTRACT

An injection molding device (1) including an actuating cylinder (15) with a piston (33). A valve pin (11) is actuated by the cylinder (15), the piston including a fluid passage (55) via which pressure medium can pass when the piston is in a position between its upper and its lower end position, and which is at least partly closed off when the piston is in its lower and/or its upper end position. Hereby relatively simple position indicator of the valve pin (11) is formed.

4 Claims, 4 Drawing Sheets

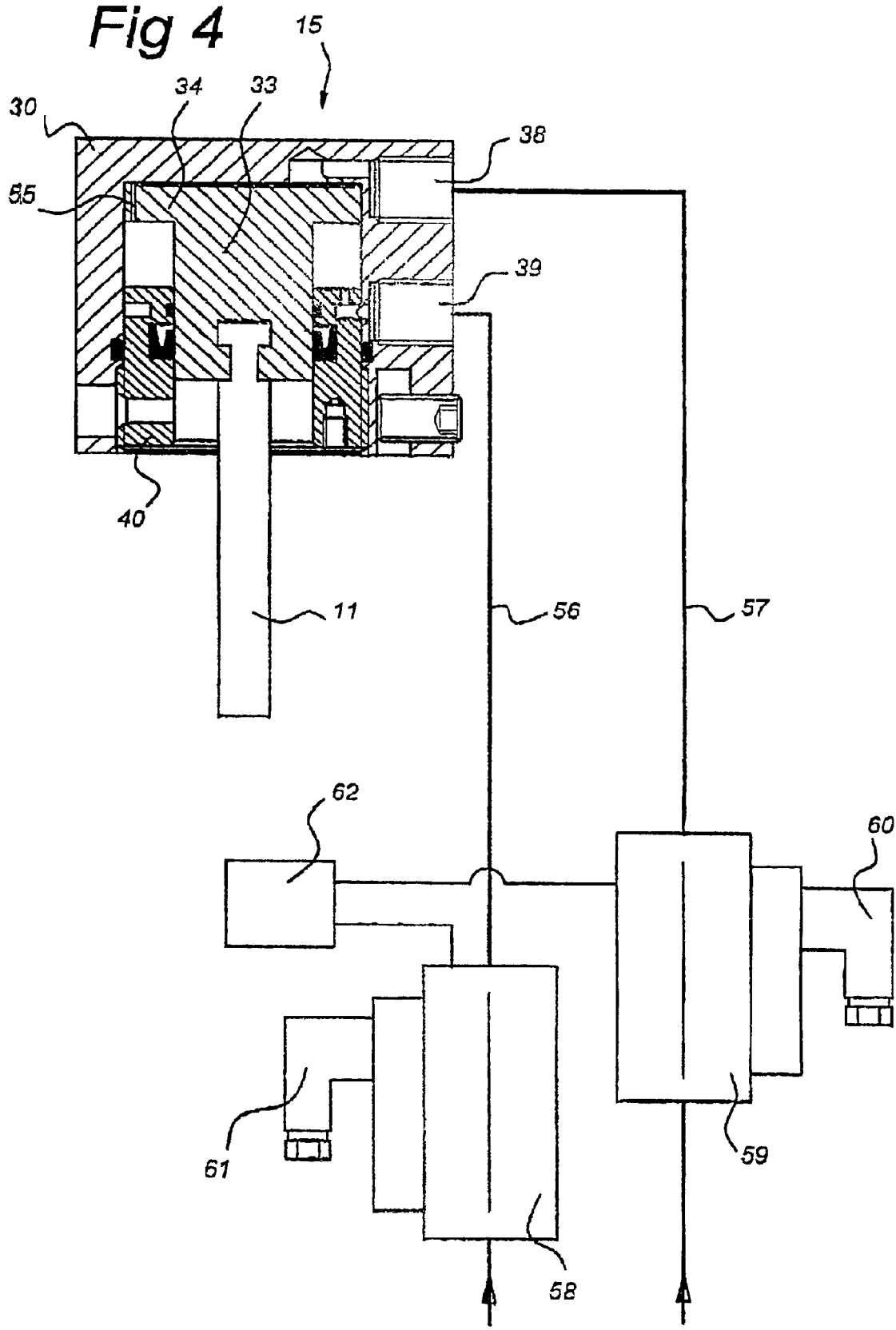

INJECTION MOULDING DEVICE COMPRISING VALVE PIN POSITION INDICATOR

BACKGROUND OF THE INVENTION

The invention relates to an injection moulding device comprising a mould body having a cavity, an elongated nozzle seated in the cavity, a valve pin coaxially in the nozzle and actuating means connected to the valve pin for axially displacing the valve pin in the nozzle, the actuating means comprising a cilinder housing having a first pressure medium inlet connected to a first pressure medium duct and second pressure medium inlet connected to a second pressure medium duct, and a piston reciprocatable in the cylinder housing between an upper end position and a lower end position, the cylinder piston being coupled to the valve pin.

The invention also relates to a cylinder for use in such an injection moulding device.

DESCRIPTION OF THE RELATED ART

A valve gated injection moulding device of the above-mentioned type is known from EP-A-0 836 925 in the name of the applicant. By axial displacement of the valve pin, the gate of the nozzle is opened and closed to control the flow of molten thermoplastic material into a mould cavity. The valve pin head projects from the upper part of the nozzle and is seated in a sliding bush, which is axially displaced by means of a lever arm. The lever arm is connected to a hydraulic cylinder that is placed at a radially offset location from the valve pin. In order to determine the closed and open positions of the valve pin, it is known to use external end switches that are connected to the piston, to switch off the supply of pressure medium at a predetermined stroke of the cylinder. Such construction requires a relatively large space. As the accuracy of the end switches may be temperature dependent, the known actuating cylinder and the end switches are used at a distance from the heated mould body. Furthermore, when the stroke of the cilinder is adjusted, in order to change the open and closed position of the valve pin, the end switches must be readjusted as well.

SUMMARY OF THE INVENTION

It is an object of the present invention to provide an end position indicator and/or control of the valve pin, which requires relatively little space, which is relatively insensitive to high temperatures and which allows the actuating cylinder to be used in close proximity to the valve pin head. It is another object of the present invention to provide an end position control, which is easily readjusted upon changing the stroke of the actuating cylinder. It is a further object of the present invention to provide an end position indicator/control device, which can be relatively easily installed in existing injection moulding devices.

Thereto the injection moulding device according to the invention is characterised in that the piston comprises a fluid passage via which pressure medium can pass when the piston is in a position between its upper and its lower end position, and which is at least partly closed off when the piston is in its lower and/or its upper end position.

When the piston is moving, a small flow of pressure medium from the high pressure side to the low pressure side of the cilinder occurs, via the fluid passage. This flow can be detected in the pressure medium supply ducts. When the piston reaches its end position, the opening in the piston is sealed, for instance by the cylinder housing and/or by a height adjustment element inside the cylinder housing, thus reducing the flow in the supply ducts. By detecting the flow and/or pressure in the supply ducts, it can be determined when the piston has reached its end position. By use of the end position detection according to the invention, the end switches, which terminate the pressure medium supply, need not be physically associated with the actuator cylinder, and can be placed away from the heated mould body, whereas the actuator cylinder can be directly placed on top of the valve pin head, on the manifold. As no end switches are directly connected to the actuator cylinder according to the invention, it can be of a relatively compact construction. Furthermore, no electrical supply lines for the end switches need be placed in the heated manifold area. The end position indicator according to the present invention can be easily installed in existing actuator cylinders, by providing a bore in the piston head, for allowing a small flow of pressure medium from the high pressure side to the low pressure side.

In stead of passing via a bore through the piston head, the pressure medium may also flow along the sides of the piston head, which may be in metal-to-metal contact with the cylinder housing.

In one embodiment, the cylinder comprises an internal height adjustment means, displaceable in the cylinder housing, forming a stop for the piston, for adjusting at least one of the end positions, When the stroke of the piston is adjusted by changing the position of a height adjustment ring in the cylinder housing, the end position indication will automatically be correct, and will need no recalibration.

The pressure medium can be formed by a gas, such as compressed air, but is preferably formed by hydraulic oil, which is stable at high temperatures. It was found by the applicant that the passage of oil within the cylinder from the high pressure side to the low pressure side, has a favourable effect on the service life of the oil by the reduction of degradation or "cracking" or the oil.

In an embodiment, the flow through the bore in the cylinder is detected by a flow detection means in at least one of the pressure medium supply ducts, for forming a displacement signal. The displacement signal may be supplied to a control or processing means to control the operation of the injection moulding apparatus, by switching on or off the supply of molten material, or may be used to form a visual indication of the needle position, for instance using a LED indicator, or on a CRT or LCD screen. The control device and the visual indicator means can all be located outside the manifold area, without the need for electrical supply lines extending to the cilinder in said manifold area.

BRIEF DESCRIPTION OF THE DRAWINGS

An embodiment of an injection moulding device comprising a valve pin position indicator and/or control system according to the present invention will be explained in detail with reference to the accompanying drawing. In the drawing:

FIG. 4 shows an end position indicator for the cylinder, comprising a flow meter in the hydraulic ducts.

DESCRIPTION OF THE PREFERRED EMBODIMENTS

Figure 1:
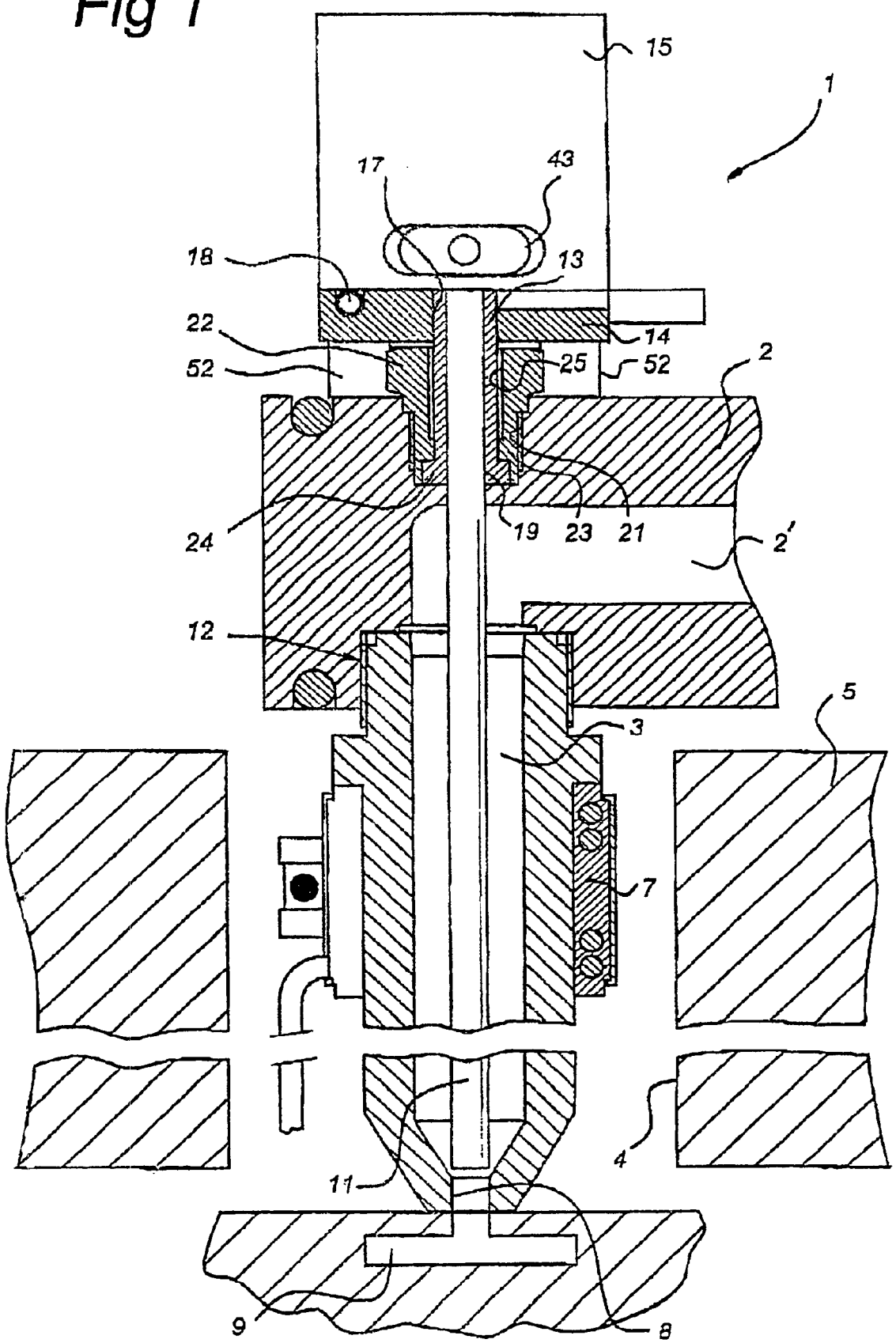
FIG. 1 shows a cross-sectional view of an in injection moulding device according to the invention.

FIG. 1 shows an injection moulding device 1, comprising a manifold 2 having a transverse duct 2' for supplying molten thermoplastic material to a vertical nozzle, or hot runner 3. In the manifold 2, the thermoplastic material is supplied at a temperature which may amount to over 350° C. at a pressure of for instance 200 bar. The nozzle 3 is connected to the manifold 2 and is seated in a well 4 of the mould body 5. The nozzle 3 is separated from the mould body 5, which may have a temperature of for instance 40° C. by an air gap, surrounding the nozzle 3. The nozzle 3 is surrounded by a heating element 7, to keep the temperature of the thermoplastic material above the melting point. The molten thermoplastic material exits the nozzle 3 via a gate 8 to enter into a mould cavity 9. The gate 8 is opened and closed by a valve pin 11, which can slide up and down in the nozzle 3. The valve pin 11 exits at the upper end 12 of the nozzle 3, a bore in the manifold 2, and is guided by a bush 13. The valve pin passes through a cooling plate 14 and is attached to a hydraulic cylinder 15 that is located in line with the valve pin 11. The bush 13 is clampingly pressed into a central bore 17 of the cooling plate 14, or is connected via a sliding fitment to be in good heat conducting contact with the cooling plate 14. The cooling plate 14 comprises a generally circular cooling channel 18, in which a cooling medium, such as water, is circulated. The relatively cool bush 13 is seated in a cavity 21 in the manifold 2 and is only supported with a relatively small surface area of the end part 19 onto the hot manifold 2, such that heat transfer from the manifold to the bush 13, and hence to the cylinder 15, is minimised.

The bush 13 is connected to the manifold 2 by a clamping ring 22, which is screwed into the cavity 21.

The clamping ring 22 comprises a shoulder 23 that engages a shoulder 24 of the bush 13. The inner sidewall 25 of the clamping ring 22 is spaced from the bush 13, such that an insulative air gap is formed between the bush and the clamping ring. By using a relatively long bush 13, which is connected to the cooling plate 14, the viscosity of the molten thermoplastic material at the position of the bush 13 is increased. Hereby leakage of molten thermoplastic material from the manifold 2 can be prevented, even at a relatively large play of the bush 13 around the valve pin 11, such as 20 micrometer or more. Furthermore, the (partly) solidified thermoplastic material in the gap between the bush 13 and the valve pin 11 has a lubricating effect, so that metal-to-metal wear of the valve pin 11 against the metal bush material is prevented.

Figure 2:
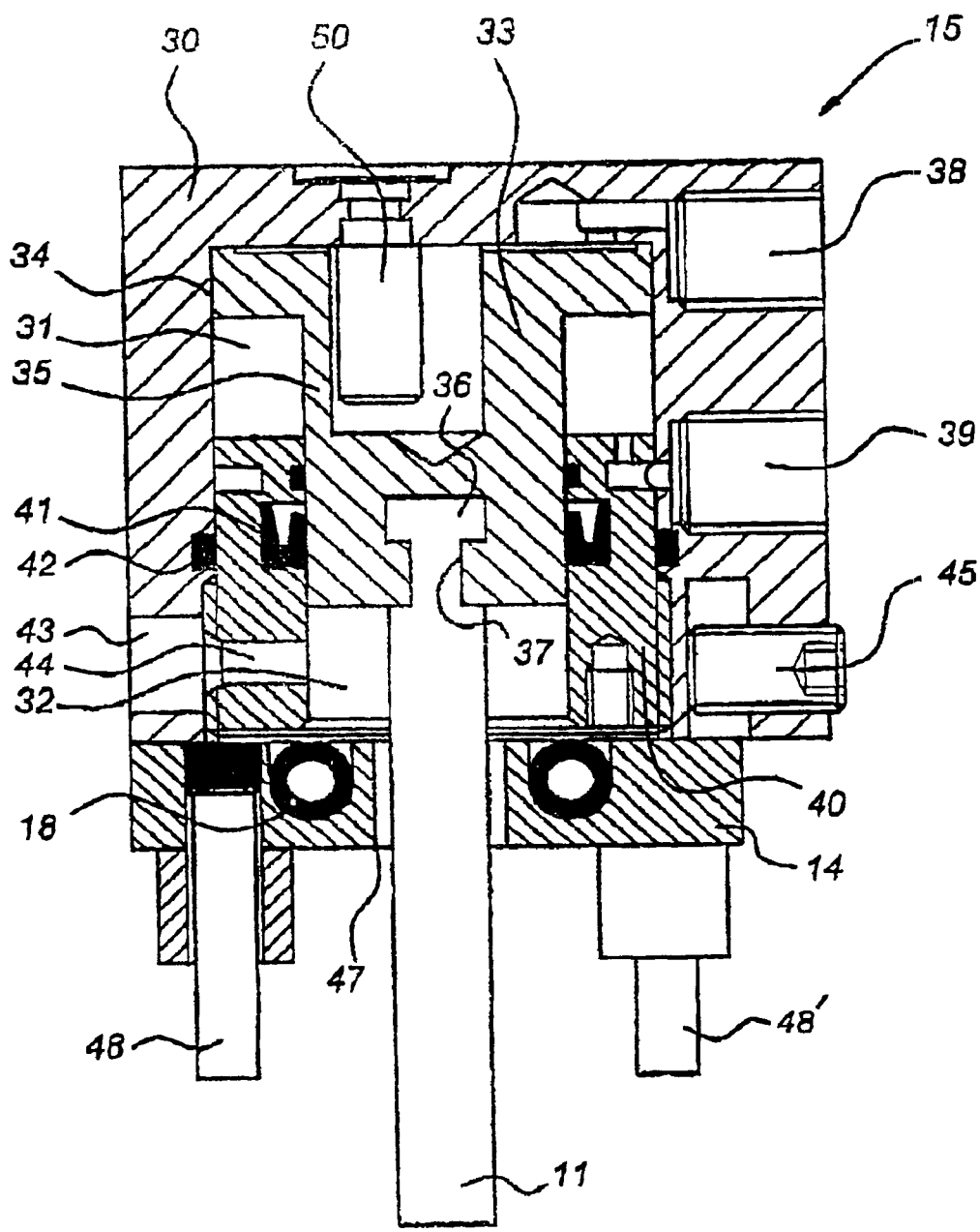
FIG. 2 shows a cross-sectional view of the actuating cylinder of the injection moulding device of FIG. 1.

FIG. 2 shows a cross-sectional view of the cylinder 15, including a cylinder housing 30 in which a piston 33 can be displaced between an upper chamber part 31 and a lower chamber part 32. The piston 33 comprises a piston head 34 and a stem 35. The stem 35 comprises a T-shaped recess 36 in which the valve pin head 37 is seated in a rotationally fixed orientation.

The cylinder housing 30 comprises two bores 38, 39, one on either side of the piston head 34, connected to fluid ducts. The stem 35 of the piston 33 is seated in a bore of a height adjustment ring 40, which is screwed into the lower part 32 of the cylinder housing 30. By axially displacing the ring 40 within the housing 30, the stroke of the piston 33 can be varied within a range of several mm. Flexible seals 41, 42, for instance made of PTFE, prevent leakage of the hydraulic oil from the chamber 31. The height adjustment ring 40 can be accessed via an elongated slot 43 in the cylinder housing 30, through which a tool can be inserted into several recesses 44 in the circumferential wall of the height adjustment ring 40, in order to rotate the ring. The ring 40 is locked at its proper height via a locking bolt 45.

The valve pin 11 enters through a central bore 47 in the cooling plate 14 into the cylinder housing 30, which is releasably connected to the cooling plate 14, which in turn is connected to the manifolds via two locating pins 48 and two bolts 48'.

The piston 33 can slide axially within the housing 30 along a locator pin 50, which maintains the piston in its desired angular orientation. The walls of the piston head 34 form a non-liquid tight connection with the inner wall of the cylinder housing, so that some hydraulic oil may leak from the high pressure side of the piston head 34 to the low pressure side, when the piston is not in either its upper or its lower end position. Hereby degradation of the hydraulic oil is prevented, and an automatic venting for removal of air from the cylinder 15 is achieved. Furthermore, the small oil flow from the high pressure side to the low pressure side of the piston head 34, which occurs while the piston is travelling from one end position to the other end position, can be used to obtain an indication of the piston position. By placing the cylinder 15 onto the manifold 2, via the cooling plate 14, the seals 41, 42 are protected from the high temperatures of the manifold. The construction of the cylinder 15 is very compact, and can easily be accommodated in the limited space available in injection moulding systems, in which a small distance between several nozzles is desired.

Figure 3:
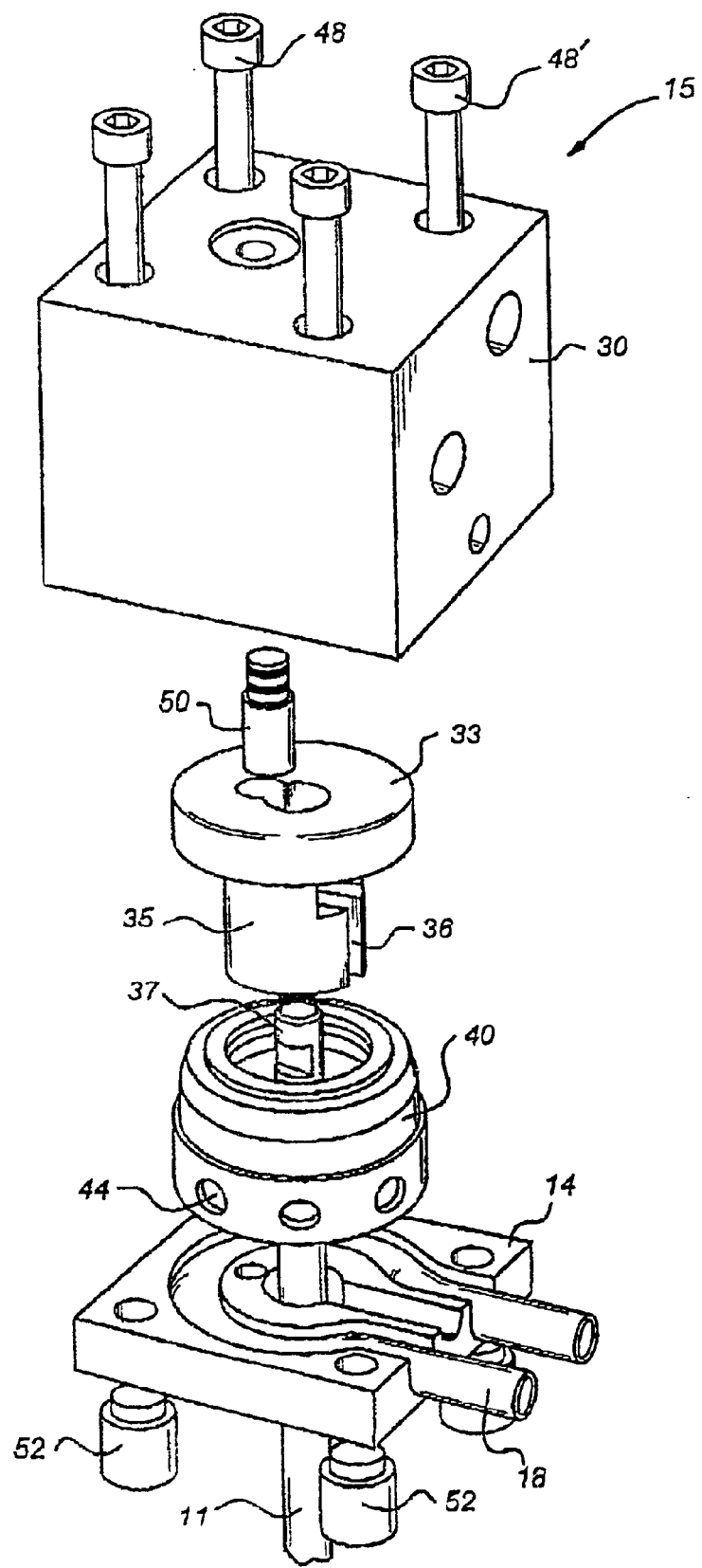
FIG. 3 shows an exploded view of the cylinder of FIG. 2.

As can be seen from FIG. 3, the cylinder housing 30 can be easily detached from the cooling plate 14 by two locating pins 48 and tow bolts 48', which project through refractive spacer members 52 via which the cooling plate 14 is supported on the manifold. After detaching the housing 30, the piston 33 can be lifted from the height adjustment ring 40. Next, the piston is moved parallel to the cooling plate 14, such that the valve pin head exits the T-shaped axial slot 36 in the piston stem 35, in the radial direction. Instead of a T-shaped slot in the piston stem 35, the valve pin head may be seated in a groove in the stem 35 and be connected by pins or bolts. In this way, the cylinder 15 can be disconnected from the valve pin 11 without removal of the valve pin 11 from the nozzle 3. Because the valve pin can remain seated within the nozzle, no cleaning of the valve pin/slide bush is required which would be the case if the valve pin were to be removed from the nozzle. Furthermore, removal of the valve pin from the nozzle would require heating of the nozzle prior to removal, which is not necessary for the valve pin, according to the present invention.

As can be seen in FIG. 4, the piston head 34 of the piston 33 comprises a bore 55, via which hydraulic oil can pass when the piston head is not engaged with the cylinder housing 30 in its upper end position or with the height adjustment ring 40 in its lower end position. In the end positions of the piston, the bore 55 is blocked such that no oil can pass through. In the hydraulic ducts 56, 57, a flow meter 58, 59 is comprised, generating a displacement signal indicating when the piston is not in one of its end positions. The displacement signals can be transmitted to a processing and/or display device 62 for indicating the end position of the valve pin 11. The processing device 62 can be used for automatic control of several valve pins in the injection moulding apparatus, for instance for sequentially filling a larger mould cavity from several nozzles. The flow meters 58, 59 as well as the processing/display device 62 can be placed outside the high temperature area of the injection moulding device. When the height adjustment ring 40 is moved to vary the stroke of the piston 33, the stopping surface of the ring 40 closing off the bore 55 is moved, such that the end position of the valve pin is indicated properly at all times. Existing injection moulding apparatus having a hydraulically or pneumatically driven valve pin can be provided with a position indicator according to the present invention in a simple manner by providing a bore 55 in the piston 33, and incorporating flow meters 58,59 in the ducts 56,57.

What is claimed is:

1. Injection moulding device (1) comprising a mould body (2,5) having a cavity (4), an elongated nozzle (3) seated in the cavity, a valve pin (11) coaxially in the nozzle and actuating means (15) connected to the valve pin for axially displacing the valve pin in the nozzle, the actuating means comprising a cylinder housing (30) having a first pressure medium inlet (38) connected to a pressure medium duct (57) and a second pressure medium inlet (39) connected to a pressure medium duct (56), and a piston (33) reciprocatable in the cylinder housing (30) between an upper end position and a lower end position, the piston (33) being coupled to the valve pin (11), a flow detection means (58,59) in at least one of the pressure medium ducts (56,57), for forming a displacement signal wherein the piston comprises a fluid passage (55) via which pressure medium can pass when the piston is in a position between its upper and its lower end position, and which is at least partly closed off when the piston is in its lower and/or its upper end position.

2. Injection moulding device (1) according to claim 1, wherein the displacement signal forms a visual indication of the pin position.

3. The device of claim 1, further comprising a cylinder the cylinder, comprising the cylinder housing (30), the first pressure medium inlet (38) connected to a first pressure medium duct (37) and to the second pressure medium inlet (39) connected to the second pressure medium duct (56).

4. Injection moulding device (1) comprising a mould body (2,5) having a cavity (4), an elongated nozzle (3) seated in the cavity, a valve pin (11) coaxially in the nozzle and actuating means (15) connected to the valve pin for axially displacing the valve pin in the nozzle, the actuating means comprising a cylinder housing (30) having a first pressure medium inlet (38) connected to a pressure medium duct (57) and a second pressure medium inlet (39) connected to a pressure medium duct (56), and a piston (33) reciprocatable in the cylinder housing (30) between an upper end position and a lower end position, the piston (33) being coupled to the valve pin (11), wherein the piston comprises a fluid passage (55) via which pressure medium can pass when the piston is in a position between its upper and its lower end position, and which is at least partly closed off when the piston is in its lower and/or its upper end position, and wherein a flow detection means (58,59) and a signal processing and/or display means (62) connected to the flow detection means are located at a distance from the mould body.

* * * * *